United States Patent [19]
Harrison

[11] Patent Number: 5,924,761
[45] Date of Patent: Jul. 20, 1999

[54] PICKUP TENT COVER AND TENT APPARATUS

[76] Inventor: Ray D. Harrison, 621 Yorktown Dr., Garland, Tex. 75043

[21] Appl. No.: 08/870,882

[22] Filed: Jun. 6, 1997

Related U.S. Application Data

[63] Continuation-in-part of application No. 08/680,148, Jul. 15, 1996.

[51] Int. Cl.[6] .......................................................... B60P 3/32
[52] U.S. Cl. ..................... 296/159; 296/26.02; 135/88.05
[58] Field of Search ................................... 296/159, 164, 296/165, 168, 160, 156, 167, 173, 26.02; 135/88.05

[56] References Cited

U.S. PATENT DOCUMENTS

| | | | |
|---|---|---|---|
| 1,353,468 | 9/1920 | Gates | 296/138 |
| 3,953,066 | 4/1976 | Hamilton | 296/160 |
| 4,294,484 | 10/1981 | Robertson | 296/156 |
| 5,018,778 | 5/1991 | Goble | 296/164 |
| 5,102,185 | 4/1992 | Lake | 296/165 |
| 5,213,390 | 5/1993 | Borchers | 296/165 |
| 5,299,849 | 4/1994 | Cook et al. | 296/165 |
| 5,358,298 | 10/1994 | Fate | 296/159 |
| 5,509,713 | 4/1996 | Hou | 296/138 |
| 5,704,681 | 1/1998 | Lambden | 296/165 |

*Primary Examiner*—Dennis H. Pedder
*Attorney, Agent, or Firm*—John A. Thomas

[57] ABSTRACT

The invention adds a camping tent to pickup trucks by taking advantage of already-installed rigid pickup bed covers. Flexible tent material is adapted to be attached to the inside of a raised rigid cover, so that a tent is formed when the cover is lifted to its raised position above the bed of a pickup truck. The attachment is by means of a bracket installed on the underside of the cover. The tent is adapted to be quickly unfolded and attached to the tailgate and side panels of the truck with quick-release fastening means. Care is taken to prevent rain water from entering the shelter thus formed by folding the tent over the edge of the tailgate, attaching it to the side panels of the truck to form a water-tight interface, and providing rain flaps to deflect rain water over the fenders of the truck and away from the interior of the bed.

14 Claims, 5 Drawing Sheets

PICKUP TENT COVER AND TENT APPARATUS

This continuation-in-part application claims the benefit of the filing date of that certain utility patent application filed Jul. 15, 1996 under serial number 08/680,148, titled "Pickup Truck Cover and Tent Apparatus," now abandoned.

BACKGROUND

This invention relates to an apparatus for covering the bed of a pickup truck with a tent, thereby making the truck suitable for camping outdoors. In particular, the present invention is intended to provide a camping tent for those pickup trucks sold with, or modified to have, a rigid cover over the bed, which cover can be raised to allow access to the bed.

Many pickup trucks are sold with rigid covers installed over their beds. Such covers have the obvious advantages of protecting objects stored in the bed from weather or from theft. Many truck owners install such covers after purchasing their trucks. Typically, the rigid covers are hinged at the end nearest the cab of the truck, so that the other end may be raised and held in that position, usually with gas cylinders or the like.

The use of tents with pickup trucks is well known in the prior art. It is natural that truck owners would wish to use their trucks for camping. However, the prior art devices have not solved the combined problems of achieving ease of assembly, low cost, and minimum modifications to the vehicle. For example, Mangino (U.S. Pat. No. 4,566,729) discloses a tent which is formed from a folding frame over the open bed of a pickup truck. However, the Mangino device is relatively complex mechanically, and it does not allow full access to the bed of the truck unless it is erected or removed. Moore (U.S. Pat. No. 5,421,633) discloses a pickup truck camper shell constructed in sections of rigid material. Moore provides the advantage of a shell which can remain on the truck while it is driven in daily use, but the Moore shell would be much more expensive to produce than the present invention. Again, the Moore shell is designed to fit over the open bed of a truck, not to take advantage of existing covers, as does the present invention.

The closest known prior art to the present invention is that disclosed by Borchers (U.S. Pat. No. 5,213,390). Borchers discloses a specially-fabricated hinged cover for the bed of a pickup truck. The cover has two sections, which are hinged together transversely, and lockable in that position. The tent portion of the Borchers cover is stored in the cover and unfolded to form a tent. The Borchers device includes the special cover, cover support means, and the tent itself. The present invention takes advantage of already-installed rigid covers, and accomplishes the solution aimed at by Borchers with less mechanical complexity.

SUMMARY

The preferred embodiment of the invention solves the problem of adding an inexpensive and easily assembled camping tent to pickup trucks by taking advantage of already-installed rigid pickup bed covers. The present embodiment comprises a tent adapted to be attached to the inside of a raised rigid cover, so that a tent is formed when the cover is lifted to its raised position above the bed of the truck. The attachment is by means of a rectangular bracket installed on the underside of the cover. The tent of the present embodiment is adapted to be quickly unfolded and attached to the tailgate and side panels of the truck with quick-release fastening means. Care is taken to prevent rain water from entering the shelter thus formed. In particular, the tent folds over the edge of the tailgate, is attached to the side panels of the truck to form a water-tight interface, and rain flaps are provided to deflect rain water over the fenders of the truck and away from the interior of the bed.

DRAWINGS

DESCRIPTION

Figure 1:
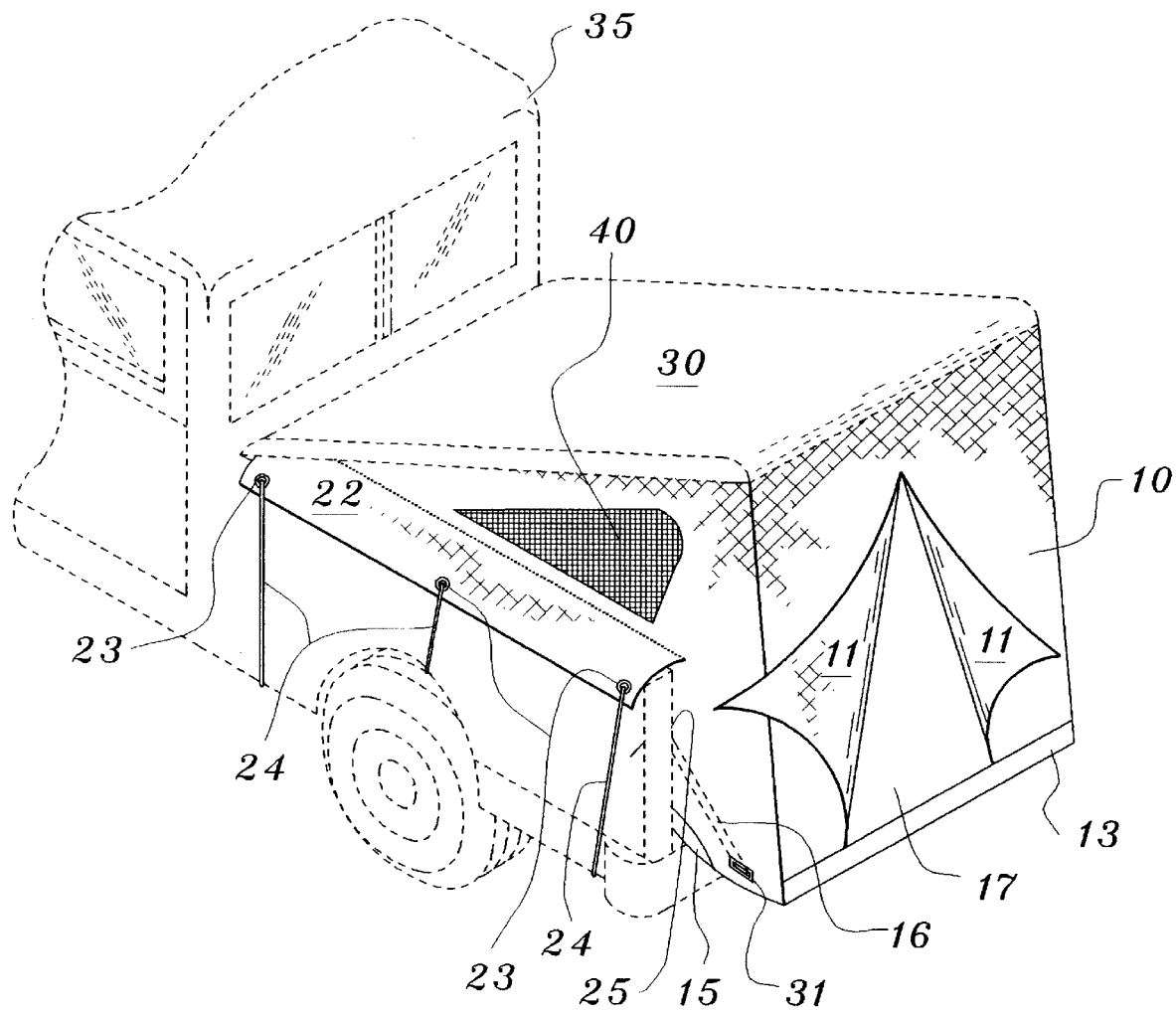
FIG. 1 is an isometric view of the present embodiment installed on a pickup truck, with the body of the truck shown in phantom lines.
Figure 5:
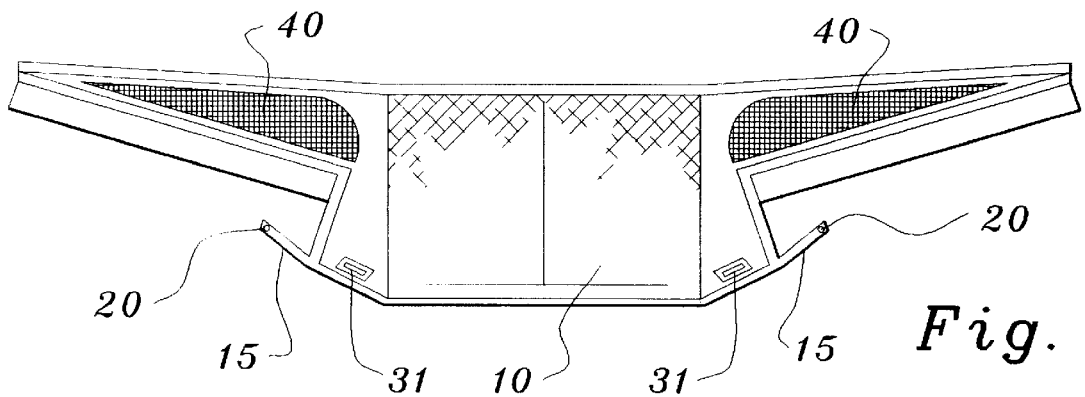
FIG. 5 is a plan view of the unfolded tent.

FIG. 1 shows a pickup truck 35 having an installed rigid cover 30 which is hinged to the truck body at the end nearest the cab of the truck 35. The tent 10 has pliant walls made of flexible material, such as rip-stop nylon in the preferred embodiment. The tent 10 is attached to the cover 30 inside the lower surface of the cover 30, thus covering the gap between the inside walls 25 and the bed 26 of the pickup truck 35, the cover 30, and the extended tailgate 12. The tent 10 has entrance flaps 11, creating an entry 17, and preferably, windows 40, the panes of which may be constructed of flexible transparent plastic or netting. The tent 10 is symmetrical, and each feature shown in the side visible in FIG. 1 has a corresponding feature on the side hidden in FIG. 1. The tent 10 is shown unfolded in FIG. 5. Thus the tent covers and protects the cargo area as defined by the inside walls 25, the bed 26, the cover 30, and the extended tailgate 12.

The tent 10 has rain flaps 22 attached along each side so as to be positioned above the walls 25 defining the cargo area of the truck 35. The rain flaps 22 are provided with a means of attaching them securely to the body of the pickup truck 35. In the preferred embodiment, each rain flap 22 has a plurality of grommets 23 for attachment of tie downs 24. The skirt 13 of the tent 10 is folded over the extended tailgate 12 of the truck 35 and held in that position by an elastic means 14 attached to the skirt 13. An opening 31 in each side of the lower edge of the tent 10 allows the passage of the tailgate arm 16, when the tailgate 12 is in its extended or down position. (Tailgate arms on pickup trucks are designed to be quickly removed and replaced by hand). A means is provided for further fastening the tent 10 to the walls of the cargo area. In the preferred embodiment, the tent 10 is further held firmly to the body of the truck 35 by straps 15 running from the lower edge of the tent 10 on each side thereof, and attached to the inside wall 25, as described below.

Figure 2:
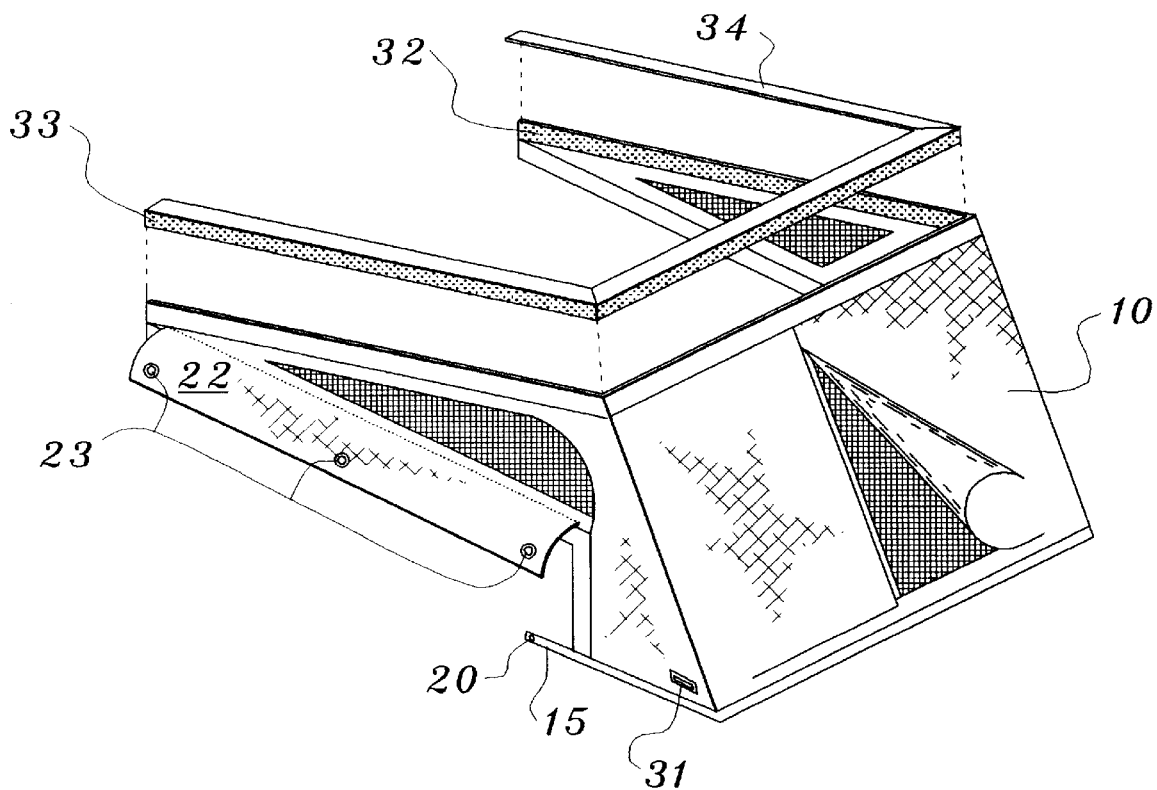
FIG. 2 is an isometric view of the tent of the present embodiment, showing the means by which it is attached to the truck body.
Figure 3:
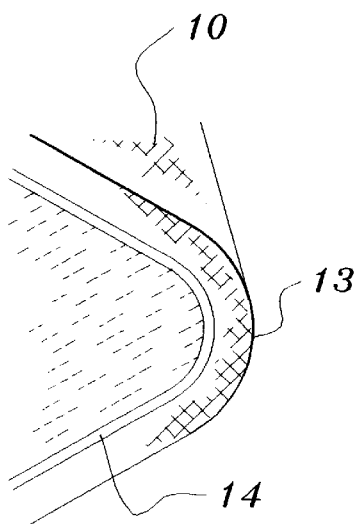
FIG. 3 is an isometric view of a portion of the tent, showing how an elastic band in the lower edge of the tent grips the tailgate of the truck.
Figure 4:
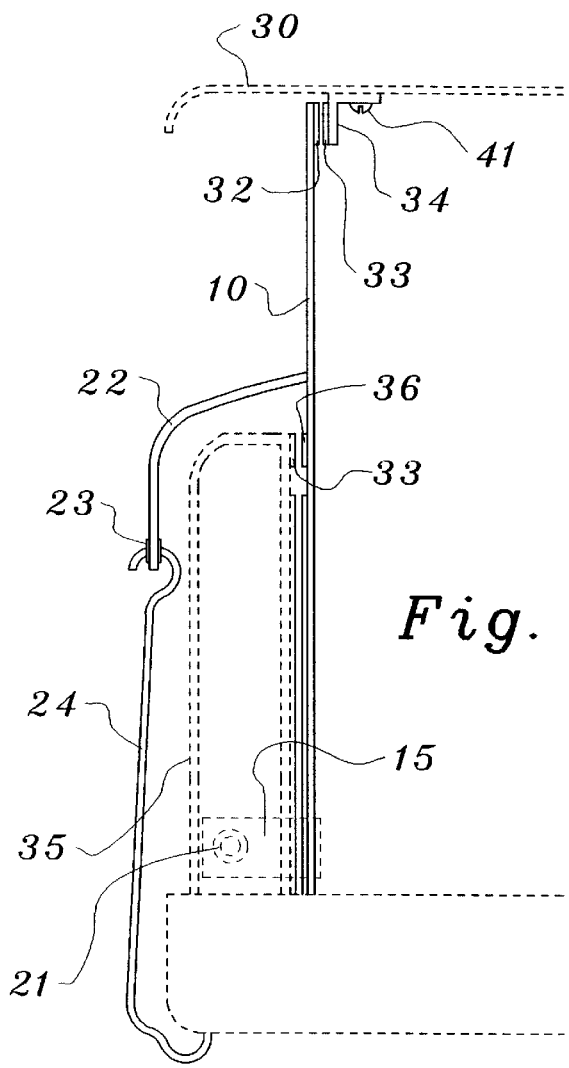
FIG. 4 is a transverse sectional view of the tent installed on the truck. Shown is one side of the connections with the cover, the inside walls defining the cargo area, and the connection of the rain flap with the truck fender.

FIG. 2 shows the tent 10 and the mounting means, in this case, a bracket 34, by which the tent is attached to the inside of the cover 30. The bracket 34 is preferably L-shaped in cross-section, so as to present one flat side to be attached to the cover 30, and another flat side perpendicular to the cover 30 for attachment of the tent 10. The bracket 34 is attached to the inside of the cover 30 by conventional means such as screws, rivets or glue. FIG. 4 shows attachment of the bracket 34 to the cover 30 by means of screws 41. A fastening means 33 is attached along the outer perimeter of the bracket 34 so as to mate with a corresponding top fastening means 32 attached to the inside top edge of the tent 10. In the preferred embodiment, these fastening means 32 and 33 are hook and loop fasteners, such as the product sold under the trademark VELCRO. When the cover 30 is placed in its raised position, the tent 10 is thus held erect, as shown in FIG. 1. A transverse cross-sectional view of the tent 10, cover 30, bracket 34, inside walls 25, truck bed 26, and truck body 35 is shown in FIG. 4.

The skirt 13 of the tent 10 has an elastic means 14, such as an elastic band, spring, or rubber band, which causes it to contract and grip the tailgate 12 of the truck. The tent 10 is further held in a weather-proof position relative to the truck body 35 by straps 15 affixed to its left and right lower edges. The straps 15 are provided with strap fastening means 20, which mate with corresponding fastening means 21 attached to the inside walls 25 of the truck 35, thus pulling the lower edge of the tent 10 tightly against the body of the truck 35. In the preferred embodiment of the invention, these strap fastening means 20 and 21 are snaps, although they could be hook and loop fasteners or hook and eye fasteners.

Figure 6:
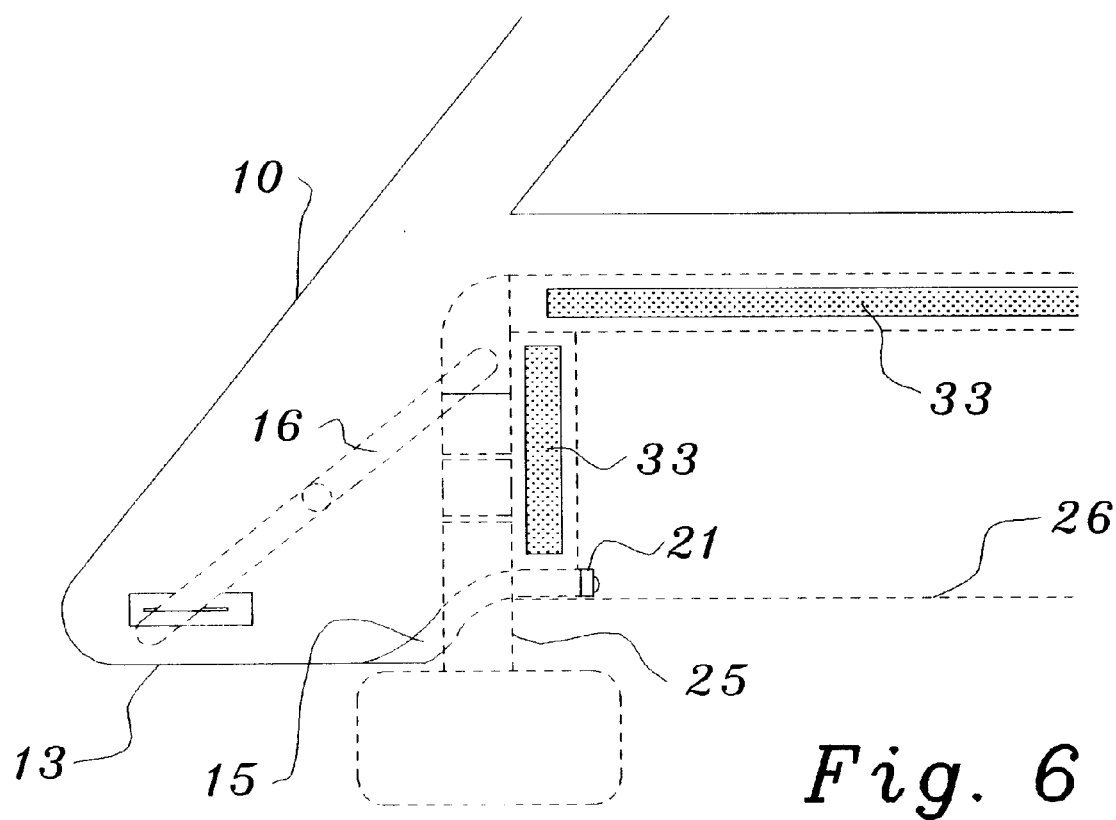
FIG. 6 is a side view of the tent as it is folded around the tailgate of the truck and fastened to the inside of the walls defining the cargo area.
Figure 7:
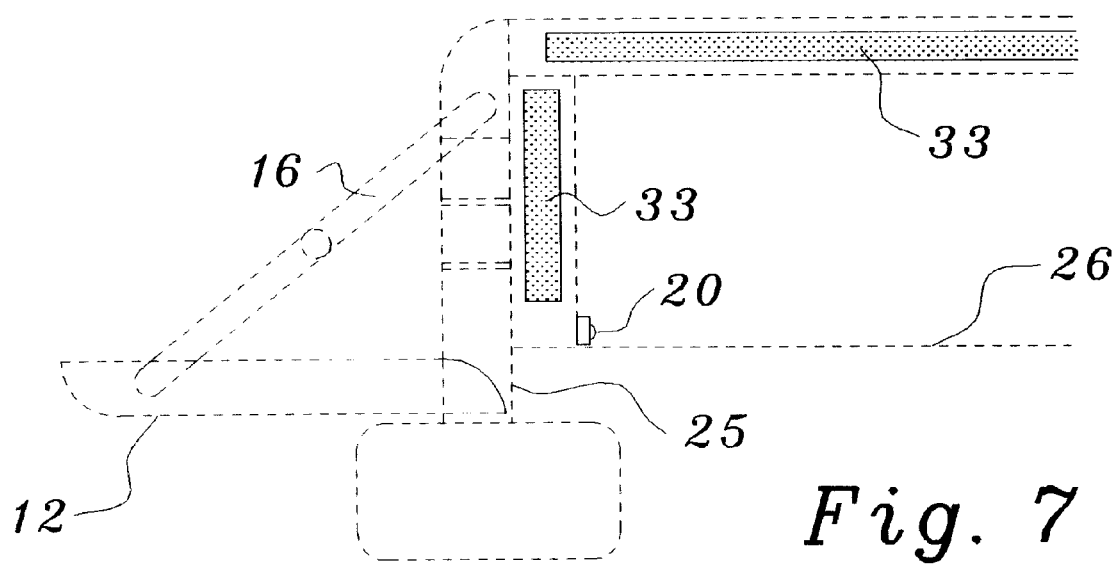
FIG. 7 is a view of the lowered tailgate of a pickup truck, and a cut-away view of the cargo area of the truck, showing the placement of fastening means on the opposite inside wall of the truck bed.

As shown in FIGS. 6 and 7, The tent 10 is further secured to the inside walls 25 of the truck body 35 by side fastening means 36 attached to its outside lower edges. These side fastening means 36 mate with corresponding side fastening means 33 attached to the inside walls of the truck body 35. In the preferred embodiment, these side fastening means 36 are hook and loop fasteners, such as the product sold under the trademark VELCRO.

Figure 8:
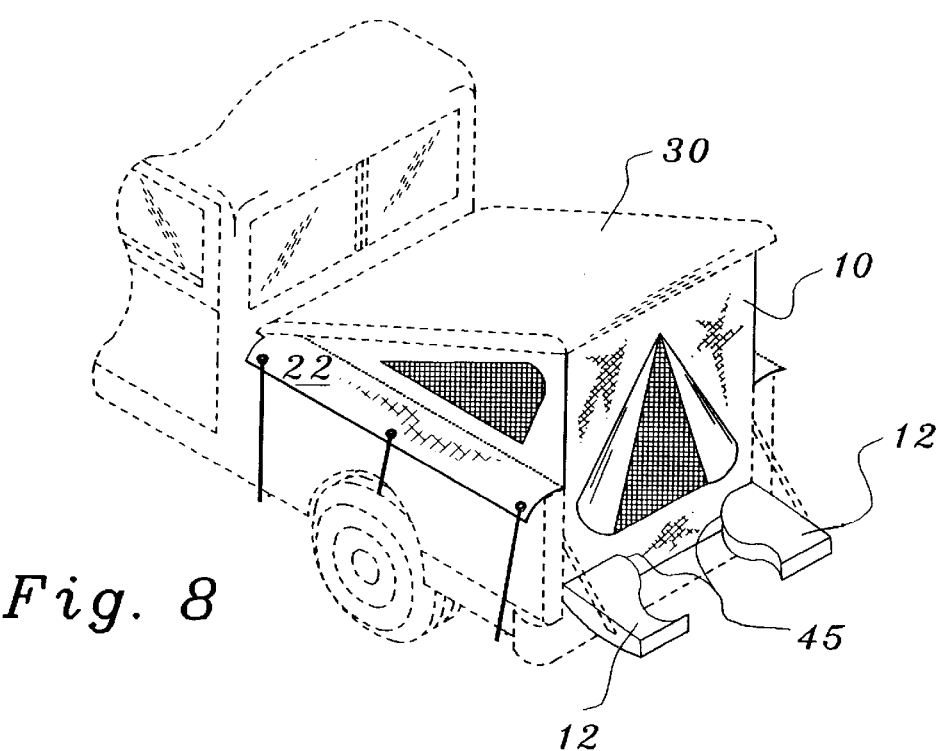
FIG. 8 is an isometric view of an alternate embodiment of the invention mounted on a pickup truck.
Figure 9:
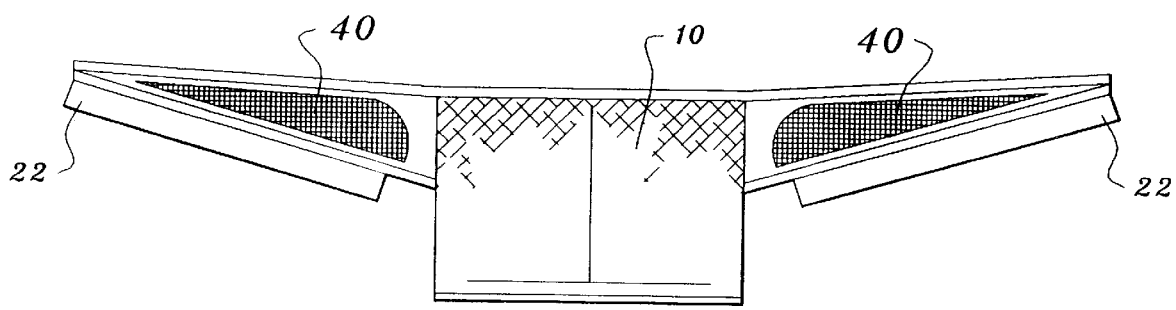
FIG. 9 is a plan view of the unfolded tent of the alternate embodiment.

An alternate embodiment of the invention is shown in FIGS. 8 and 9. In this embodiment, the tent 10 lacks a skirt 13. Instead the tent 10 is shaped so that the wall of the tent 10 having the entry 17 hangs substantially vertically from its attachment to cover 30, and passes through the gap 45 between the tailgate 12 and the bed 26 of the pickup truck 35. In this embodiment, there is no need for the straps 15 or the opening 31 in the sides of the lower edge of the tent 10. The hanging wall of the tent 10 will remain disposed between the bed 26 and the tailgate 22 without the need of the elastic means 14 in the skirt 13 of the preferred embodiment. In other respects this embodiment is attached to the pickup truck 35 as described above in the description of the preferred embodiment.

The reader will see that the need for achieving ease of assembly, low cost, and minimum modifications to the vehicle when adding a camping tent to a pickup truck has been attained by the present invention, as described above. Since certain changes could be made in the embodiment of the invention described above without departing from the spirit and scope of the invention, I intend that all matter contained in the foregoing description and drawings shall be interpreted as illustrative and not in a limiting sense.

I claim:

1. A pickup truck tent apparatus for protecting the cargo area of a pickup truck; the pickup truck cargo area having a pre-existing rigid and raisable cover; the cargo area being defined by a truck bed, inside walls, outside walls, and a moveable tailgate; the tailgate having support arms, the tent apparatus comprising:
   a. A tent having a pliant wall of sufficient size to cover a gap between the cover in its raised position, the truck bed, the inside walls, and the moveable tailgate in its down position; the tent further comprising:
      i. elastic means for holding the tent to the tailgate in its down position;
      ii. openings in the tent so as to allow the passage there through of the tailgate support arms;
      iii. means for fastening the wall of the tent to the inside walls of the cargo area, the tent wall extending along the inside walls;
      iv. rain flaps attached to the tent wall and extending to the respective outside wall, each rain flap having a means for securing the rain flaps to the pickup truck;
   b. mounting means for connecting the tent to the cover; the mounting means comprising a bracket attached to the cover; and, a means for fastening the tent to the bracket; and,
   c. an entry positioned in the tent.

2. The pickup truck tent apparatus of claim 1 where the elastic means for holding the tent to the tailgate in its down position comprises an elastic band.

3. The pickup truck tent apparatus of claim 1 where the means for fastening the tent to the inside walls defining the cargo area comprises hook and loop fasteners.

4. The pickup truck tent apparatus of claim 1 where the means for securing the rain flaps to the pickup truck comprises grommets attached to the rain flaps and tie downs connected to the grommets.

5. The pickup truck tent apparatus of claim 1 where the tent has at least one window.

6. The pickup truck tent apparatus of claim 5 where the window is made from netting.

7. The pickup truck tent apparatus of claim 1 where the tent is made of rip-stop nylon.

8. A pickup truck tent apparatus for protecting the cargo area of a pickup truck; the pickup truck cargo area having a pre-existing rigid and raisable cover; the cargo area being defined by a truck bed, inside walls, outside walls, and a moveable tailgate; the tailgate having support arms, the tent apparatus comprising:
   a. A tent having a pliant wall made of rip-stop nylon of sufficient size to cover a gap between the cover in its raised position, the truck bed, the inside walls, and the moveable tailgate in its down position; the tent further comprising:
      i. a skirt attached to the tent; the skirt having an elastic band attached thereto, so as to cause the skirt to be held to the tailgate in its down position;
      ii. openings in the tent so as to allow the passage there through of the tailgate support arms;
      iii. straps attached to the tent, each strap having a first strap snap fastener;
      iv. rain flaps attached to the tent wall and extending to the respective outside wall, each rain flap having a plurality of grommets for the attachment of tie downs;
      v. tie downs attached to the grommets and to the pickup truck;

vi. top and side hook and loop fasteners attached to the tent;

b. a bracket, the bracket having a first and second side; the first side of the bracket attached to the cover; the bracket further having first hook and loop tent fasteners attached to second side thereof corresponding to the top hook and loop fasteners attached to the tent, and for engagement therewith;

c. second tent hook and loop fasteners attached to the inside walls of the truck cargo area, corresponding to the side hook and loop fasteners attached to the tent, and for engagement therewith for fastening the wall of the tent to the inside walls, the tent wall extending along the inside walls;

d. second strap snap fasteners attached to the inside walls of the truck cargo area, for engagement with the first strap snap fasteners attached to the straps;

e. an entry positioned in the tent; and, f. at least one window positioned in the tent, the window pane being made of netting.

9. A pickup truck tent apparatus for protecting the cargo area of a pickup truck; the pickup truck cargo area having a pre-existing rigid and raisable cover; the cargo area being defined by a truck bed, inside walls, outside walls, and a moveable tailgate; the tailgate having support arms; the tailgate and the truck bed defining a gap between themselves; the tent apparatus comprising:

a. A tent having a pliant wall of sufficient size to cover a further gap between the cover in its raised position, the truck bed, and the inside walls; a portion of the tent passing through/the gap; the tent further comprising:

i. means for fastening the wall of the tent to the inside walls of the cargo area, the tent wall extending along the inside walls;

ii. rain flaps attached to the tent wall and extending to the respective outside wall, each rain flap having a means for securing the rain flaps to the pickup truck;

b. mounting means for connecting the tent to the cover; the mounting means comprising a bracket attached to the cover; and, a means for fastening the tent to the bracket; and, c. an entry positioned in the tent.

10. The pickup truck tent apparatus of claim 9 where the means for fastening the tent to the inside walls defining the cargo area comprises hook and loop fasteners.

11. The pickup truck tent apparatus of claim 9 where the means for securing the rain flaps to the pickup truck comprises grommets attached to the rain flaps and tie downs connected to the grommets.

12. The pickup truck tent apparatus of claim 9 where the tent has at least one window.

13. The pickup truck tent apparatus of claim 12 where the window is made from netting.

14. The pickup truck tent apparatus of claim 12 where the tent is made of rip-stop nylon.

* * * * *